Sept. 26, 1961  P. R. TUNNICLIFFE ET AL  3,001,923
CONTROL OF ATOMIC POWER REACTORS
Filed July 25, 1956 3 Sheets-Sheet 3

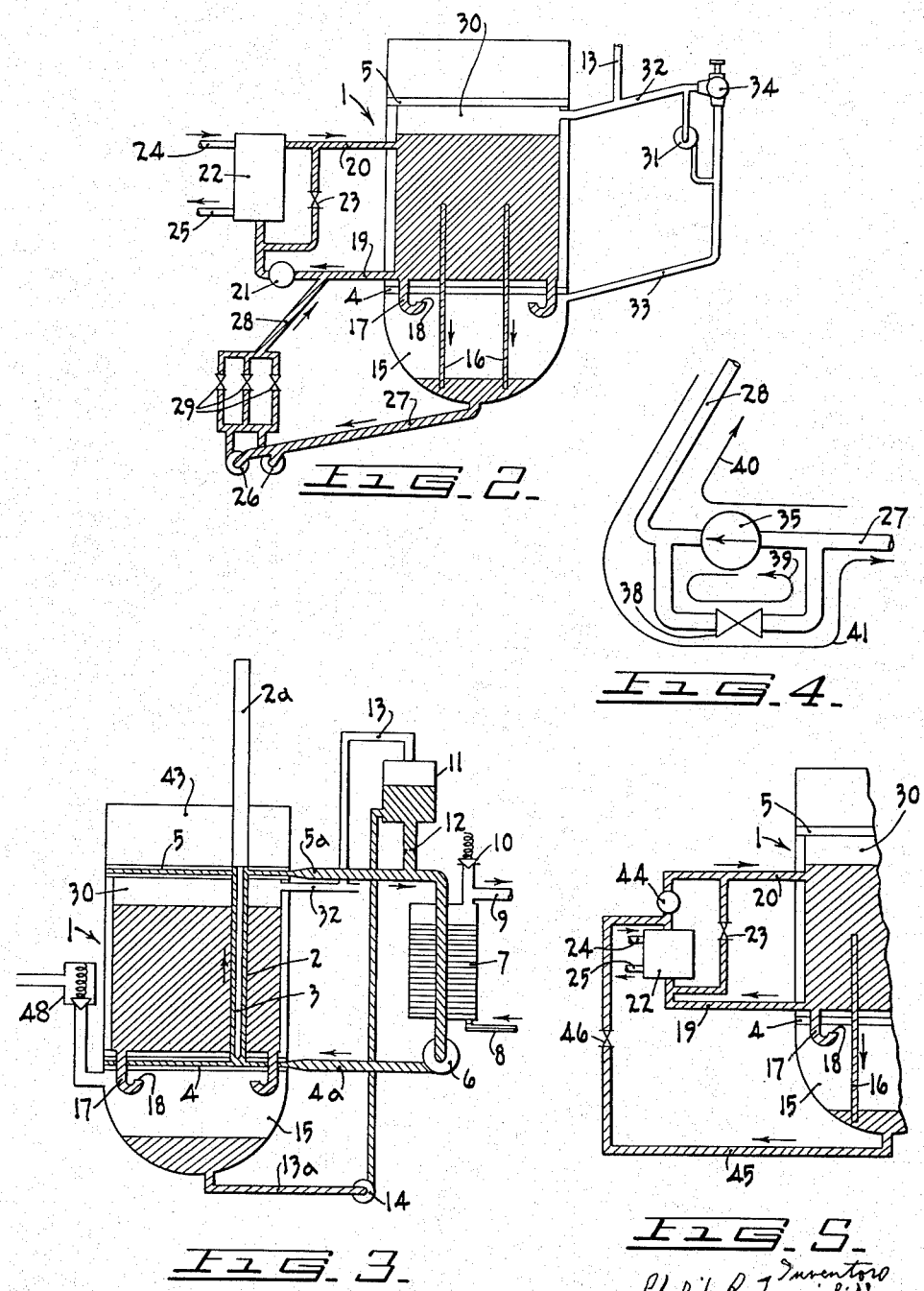

Inventors
Philip R. Tunnicliffe
Ernest Siddall
Melville Douglas Berry
Stanley James Whittaker
by Stevens, Davis, Miller & Mosher
their attorneys

3,001,923
CONTROL OF ATOMIC POWER REACTORS

Philip R. Tunnicliffe, Ernest Siddall, Melville Douglas Berry, and Stanley James Whittaker, all of Deep River, Ontario, Canada, assignors to Atomic Energy of Canada Limited, Ottawa, Ontario, Canada, a company
Filed July 25, 1956, Ser. No. 600,081
Claims priority, application Canada Aug. 6, 1955
10 Claims. (Cl. 204—193.2)

This invention relates to improvements in the control of atomic power reactors, including small power research reactors.

As is well known it is necessary to provide two types of control over the reactivity of an atomic reactor; firstly, fine control to be exercised during normal operation in order to maintain the desired level of power output; and secondly, high speed control for rapidly reducing the reactivity for emergency shut-down.

The former type of control, that is to say fine control, may be obtained by the movement into or out of the reactor core of neutron absorbing rods, by movement of parts of the reflector, or by variation of the level of the moderator (if liquid) which is contained in the reactor vessel and which acts as the neutron moderator. Hitherto it has been thought impractical to effect emergency shut-down by variation of the moderator level. This view has been taken principally because it has not been considered feasible to lower the moderator level in the reactor vessel sufficiently quickly to ensure rapid shut-down, i.e. to reduce the level to well below that normally required for criticality in a matter of a few seconds. In particular, it has not been considered possible to lower the moderator level drastically at anything like the same speed that shut-off rods could be inserted into the reactor vessel.

In accordance with the present invention a system has now been developed which enables such shut-off rods to be dispensed with entirely, thus eliminating their inherent disadvantage of a comparatively high mechanical failure risk. It has now been found that it is possible to provide a moderator control system that will permit draining (dumping) of the moderator from the reactor core into a suitable storage space at a sufficiently rapid rate to effect the high rate of reduction of reactivity required for emergency shut-downs.

The invention may thus be defined as a method of effecting emergency shut-down of an atomic power reactor of the type comprising a core vessel serving to house fissile fuel immersed in a liquid moderator, said method comprising rapidly draining said moderator from said vessel.

In its structural aspect, the preferred form of the invention consists of an atomic power reactor comprising a core vessel, coolant circulating tubes therein, a storage chamber disposed at a level below the floor of said vessel, fine moderator level control means for effecting net transfer of liquid between said vessel and said chamber in either direction at a slow rate, an uninterrupted passageway of large cross-sectional area extending between the lower part of said vessel and the upper part of said chamber, said passageway including a downwardly projecting loop, means for maintaining a gaseous pressure in said chamber in excess of a gaseous pressure in said vessel sufficient at least substantially to support a body of liquid in said vessel by action against a stable free surface of such liquid in said passageway adjacent said loop, and means for rapidly eliminating said excess gaseous pressure.

The accompanying drawings illustrate diagrammatically and by way of example, an atomic reactor adapted to operate in accordance with the present invention.

FIGURE 2 shows a simplified schematic illustration of the reactor of FIGURE 1 and the ancillary parts concerned with circulation of the moderator;

FIGURE 3 shows a simplified schematic illustration of the reactor of FIGURE 1 and the ancillary parts concerned with circulation of the coolant;

FIGURE 4 shows a fragment of the system seen in FIGURE 2 illustrating a modification;

FIGURE 5 shows a fragment of the system seen in FIGURE 2 illustrating a further modification;

Many of the parts illustrated are identical with those already described, and the same reference numerals will be employed wherever applicable.

Figure 1:
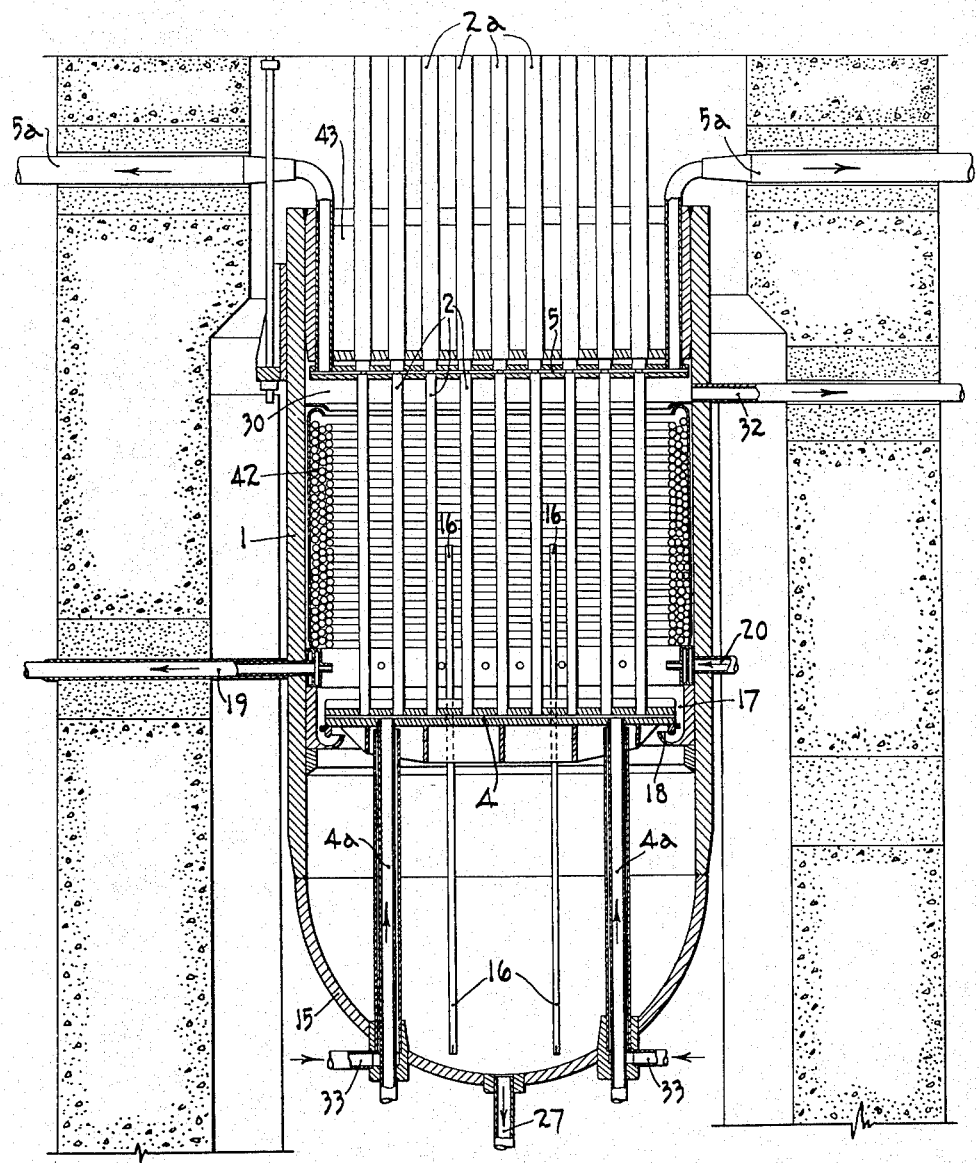
FIGURE 1 shows a central vertical cross-section of the reactor vessel.

Referring primarily to FIGURE 1, the reactor core will be seen to comprise a conventional cylindrical shielded pressure vessel 1 having a series of vertically extending tubes 2 in which are mounted rods 3 of fissile fuel (e.g. uranium). See the cut away tube 2 in FIGURE 3. The rods 3 may be withdrawn upwardly into tubes 2a. The tubes 2 each extend from a lower header 4 to an upper header 5 whereby coolant (e.g. heavy water, $D_2O$), may be caused to flow upwardly through each of the tubes 2 and around the fuel rods 3 under the action of a pump 6 (also best appreciated from FIGURE 3). The coolant flows in the conventional manner from the upper header 5 through conduits 5a to a main heat exchanger 7 having a feed water inlet 8, a steam outlet 9 and a safety valve 10. The coolant is returned by the pump 6 to the lower header 4 through conduits 4a. This cooling system, which constitutes the energy removal system, also includes a coolant head tank 11, the lower part of which connects with the conduit 5a through a flow restricting orifice 12. The upper part of the head tank 11 is connected by a conduit 13 to a conduit 32 leading to the upper part of the reactor vessel 1 for the purpose of maintaining a pressure balance, as will later be described. The cooling system is completed by a coolant make-up pump 14 that serves to draw heavy water along conduit 13a from the bottom of a moderator storage chamber 15 situated beneath the core of the reactor vessel 1, and to force such heavy water up into the head tank 11, thus always ensuring an adequate quantity of coolant. Excess can spill back into the vessel 1 via the conduit 13. The coolant and the moderator being the same liquid ($D_2O$), it is practical to interconnect the two fluid systems.

Communication between the reactor vessel 1 and the moderator storage chamber 15 exists through a pair of comparatively small bore stand pipes 16 that extend downwardly to the floor of the moderator storage chamber 15 from a level in the reactor vessel 1 equivalent to the level of moderator in such core when the core is approximately 45% full. A second means of communication between the vessel 1 and the storage chamber 15 is an annular downwardly extending passageway 17 which includes a downwardly projecting loop leading to an upwardly extending portion that terminates in an annular port 18. The passageway 17 may be considered as a figure of revolution of a U-tube. It is important to note that this passageway 17 is not closed in any way and represents a large area of unrestricted communication between the reactor vessel 1 and the moderator storage chamber 15.

A cooling system is also provided for the moderator (heavy water), this cooling system consisting of conduits 19 and 20 (see especially FIGURE 2), a pump 21, a heat exchanger 22, and a control valve 23 arranged in parallel with such heat exchanger. Cooling light water ($H_2O$) enters and leaves the heat exchanger 22 by conduits 24 and 25 respectively.

The level of the moderator in the reactor vessel 1 is controlled by a pair of control pumps 26 that draw the moderator liquid from the storage chamber 15 along a conduit 27 and feed it back into the reactor vessel 1 along a conduit 28 which extends into the conduit 19, a number of parallel connected control valves 29 being arranged in this circuit. This constitutes a third means of communication between the vessel 1 and the chamber 15.

Since, of course, the coolant must be maintained at high pressure to avoid its boiling (for example, approximately 1200 pounds per square inch), it is necessary to balance this pressure on the inside of the walls of the tubes 2 by a comparable pressure outside the tubes in the vessel 1 and thus in the moderator storage chamber 15. This pressure is maintained by means of helium the bulk of which is normally, i.e. during operation of the reactor, found above the body of moderator in the storage chamber 15. This is the condition illustrated in FIGURES 2 and 3. Helium will also occupy the space 30 above the free upper surface of the moderator in the vessel 1, and balance between these two parts of the system is maintained by a pump 31 (FIGURE 2) which serves to draw helium from the space 30 along the conduit 32 and to feed such helium along a conduit 33 to the moderator storage chamber 15. A dump valve 34, of a type specially adapted for rapid operation and large flow, is arranged in parallel with the pump 31 between conduits 32 and 33. In practice more than one dump valve may be arranged in parallel as an insurance against mechanical failure.

It is envisaged that it may be possible to dispense with the body of helium and simply employ vapour generated by heating of the moderator. The important requirement is that some form of inert gas or vapour be employed, that is to say a gas or vapour inert, or as far as possible inert, both chemically and physically to the actions going on in the reactor.

The parts seen in FIGURE 1 also include a light water reflector contained in a spiral of tubing 42 for convenience; and a cooling jacket 43—also employing light water—surrounding parts of the tubes 2a. Other conventional accessories will be provided as necessary, such as safety valve 48 connected to the chamber 15. In general these have been omitted for clarity of illustration.

In normal operation the moderator level will be somewhat as appears in FIGURES 2 and 3. The excess pressure of the helium in the chamber 15 as provided by the pump 31, will serve to support the weight of the bulk of moderator in the vessel 1, the helium being in contact with the stable free liquid surface in the passageway 17 adjacent the loop therein. In practice a helium pressure differential slightly greater than that needed to support the moderator in the vessel 1 is provided between the chamber 15 and space 30 so that helium will bubble slowly around the loop of the passageway 17 and up through the body of the moderator in the vessel 1 to the space 30.

At the same time there will be a steady slow drainage of moderator from the vessel 1 down through the stand pipes 16 into the chamber 15, which will be continually compensated for by a quantity of moderator being pumped back into the reactor vessel 1 by the pumps 26. Control of the level of the moderator in the vessel 1 will thus be dependent on the settling of the control valves 29 which can be adjusted at will to over- or under-compensate for the drainage through the stand pipes 16, or to maintain the level exactly steady. In practice, there will be continuous small variations of moderator levels due to variations in reactivity from various causes. The control valves 29 thus represent the primary fine control over the moderator level and will thus be employed for the adjustment of this level necessary to maintain the reactivity (sometimes known as multiplication factor $k$) of the core at or near criticality. Criticality is unity reactivity, at which the power output remains steady.

Additional fine control over the reactivity of the core can be exercised by means of temperature variation of the moderator, this temperature control being obtained by means of the valve 23 which serves to by-pass more or less moderator from the heat exchanger 22, as required. This secondary fine control is slower acting than the primary fine control, by reason of the thermal capacities involved, and is not normally employed for normal operating short term control. The value of this secondary fine control will be explained below.

Whenever an emergency shut-down should become necessary, this will be effected by rapid opening of the dump valve 34. As a result the excess pressure of helium in the storage chamber 15 will immediately disappear so that the moderator will commence to flow under gravity rapidly and wholly unobstructedly out of the core vessel 1 and through the large area passageway 17 and port 18 into the chamber 15. The size of the storage chamber 15 will be sufficient to contain approximately half the volume of the moderator plus the total volume of the primary coolant, thus providing for evacuation of the vessel 1 to a half full condition even with rupture of a tube 2 and escape of the primary coolant into the body of the vessel 1. Normally, with no escape of coolant, the vessel 1 will drain down to approximately one fifth full before the storage chamber 15 fills.

Sudden drainage of the moderator from the reactor core will serve rapidly to increase the ratio between the surface area of the moderator (the effective part of the reactor) and the volume of the moderator (and thus the volume of the effective fuel, since no chain reaction can continue in fuel not immersed in moderator). Since this surface to volume ratio determines (inversely) the reactivity of the core, i.e. the average number of neutrons produced per neutron dying (through absorption or leakage), the reactivity can quickly be reduced below unity. Once the reactivity has been taken below unity, no sustained reaction can take place.

It is calculated that a reactor constructed in accordance with the present invention will perform in the following manner:

| Percentage of initial moderator height | Time in seconds after initiation of emergency | Reactivity Reduction in milli-$k$ |
|---|---|---|
| 100 | 0.3 | 0 |
| 90 | 1.6 | −5.5 |
| 80 | 3.0 | −13.5 |
| 70 | 4.4 | −25.0 |
| 60 | 6.0 | −41.0 |
| 50 | 7.7 | −68.0 |

The calculated maximum drain rate of moderator will be 46 cubic feet per second.

As mentioned above, control over the moderator temperature serves to provide an additional control over reactivity. The ability to vary the moderator temperature enables the core vessel in normal operation to be full or substantially full, i.e. with a relatively hot moderator, and thus to provide more complete usage of the fuel with corresponding optimum power output. On the other hand, the system provides the ability to have the moderator cold for start-up. A cold moderator is more effective in its function of slowing down neutrons than a hot moderator and thus serves to raise the reactivity more quickly per unit volume of moderator pumped into the core vessel than would a hot moderator. Means may conveniently be provided (not shown) for automatically regulating the moderator cooling control valve 23 in accordance with the moderator level in the core vessel.

Ability to provide a cool moderator for start-up is of considerable advantage in overcoming the difficulty presented by the growth of xenon poison. Xenon 135 is a most effective poison e.g. a substance effective to reduce reactivity, and is one of the indirect fission products of uranium 235 and other fissile materials, being produced from iodine 135. During normal operation the quantity of xenon in the core reaches a relatively low balanced level in equilibrium between its rate of production and its loss by natural decay and neutron absorption, and this quantity of xenon is insufficient to prevent the reaction. But on shut-down the free neutrons, of which previously there was a high population, substantially disappear, so that destruction of xenon 135 which is now restricted to loss by natural decay continues at a much reduced rate. On the other hand production of xenon 135 continues to take place from the iodine 135 still present in the fuel (although at a decreasing rate since the iodine itself is not being replenished), and as a result the xenon 135 level rises sharply. This phenomenon can result in "poisoning" of the reactor with complete inability to start up for a period as long as one to two days, and is a common occurrence if a shut-down has continued for more than about one hour. The variable cooling system for the moderator which forms part of the present invention enables especially high reactivity to be obtained initially on start-up, and thus has the effect of allowing a substantially longer shut-down, because a greater degree of poisoning can be tolerated. Once the reactor has been started up, the xenon poison effect rapidly disappears, the high neutron population that immediately results from operation of the reactor soon reducing the xenon level.

It is found advantageous in practice to raise the reactivity part-way to criticality during shut-downs, after the initial reduction of reactivity. This serves to reduce the range of reactivity over which the reactor must be taken during start-up but more importantly minimizes the chance of a sudden unexpected rise of reactivity, which will result in possible loss of control. Thus a breathing space is provided during which an unexpected reactivity rise might be discovered and checked.

The most important practical advantage of the present system is its many safety aspects. The system is such that most of the more likely faults will have the effect of tending to reduce reactivity. If the pumps 26 should stop, for example, the moderator will automatically drain from the core. If the pump 21 should stop, the moderator temperature will rise and this also tends to reduce reactivity. Similarly should the helium pump 31 stop, the excess pressure in the storage chamber 15 will disappear and again the moderator will drain.

An additional safety aspect of the invention is the large cross-sectional area of the port 18 and passageway 17 that connect the moderator in the core with the storage chamber. This port is not capable of being closed by any external means and the large dimensions combined with the distribution around the entire periphery of the core, very greatly reduces the possibility of a blockage in this passageway in the event of mechanical failure that might lead to parts of the structure of the reactor coming loose within the vessel.

Moreover, it will be noted that it is impossible for moderator to be forced from storage into the core by an excess helium pressure differential. If such a differential should exist it would merely result in bubbling of the helium up through the passageway 17 to find its way eventually into the space 30.

Probably the most dangerous form of fault is failure of the primary coolant. Failure of this coolant for only a few seconds may prove sufficient to allow the uranium rods 3 to reach their melting point. Although failure of the cooling pump 6 does not automatically reduce reactivity, the cooling system may conveniently be interlocked with the dump valve 34, so that mechanical failure, excess temperature or excess pressure in the cooling system will instantly open the valve 34.

In this example, in which the same liquid is used for coolant and moderator, pressure balance between the two independent systems, namely the cooling system and the moderator system, is maintained by the pump 14 and the balance pipe 13. The pump 14 forces a small quantity of moderator drawn from the floor of the chamber 15 up through conduit 13a into the coolant head tank 11, the helium pressure in the space 30 being simultaneously connected through the conduit 13 to the upper portion of such head tank 11. Any excess of heavy water in the head tank 11 can drain back into the reactor core through the conduit 13.

FIGURE 4 shows a modified system of fine moderator level control. This system eliminates the need for the stand pipes 16. The conduit 27 leading from the floor of the chamber 15 communicates both with a pump 35 and one side of a valve 38, the other sides of this pump and valve being connected together and extending into the conduit 28 which leads back via the conduit 19 to the vessel 1. The pump 35 is arranged to pump moderator in a closed circuit around through itself and the valve 28, as indicated by the arrow 39. It also serves to pump moderator in a separate hydraulic circuit indicated by the arrow 40, i.e. from the conduit 27 into the conduit 28; and by virtue of the flow through the valve 38 to induce flow in a third circuit from the conduit 28 and through the valve 38 to the conduit 27 (arrow 41). If the opening of the valve 38 is increased, the flow in the circuits represented by the arrows 39 and 41 is increased and that represented by the arrow 40 is decreased. Thus a large opening of the valve 38 will act to drain moderator from the reactor vessel 1 while a small opening of the valve 38 will serve to pump additional moderator up into the reactor vessel 1, the flow 40 then predominating. Such a reversible pumping system eliminates the need for the constant drain of moderator provided for by the stand pipes 16, but nevertheless avoids any need to stop or reverse the direction of the pump.

A third possible method of exercising fine control over the flow of moderator between vessel 1 and chamber 15 is illustrated in FIGURE 5. Here the moderator cooling pump 44, situated now on the downstream side of the heat exchanger 22, is also used to control upward flow of moderator from the chamber 15 to the vessel 1. This effect is accomplished by a conduit 45 extending from the intake side of the pump 44 to the floor of the chamber 15. Assuming a pressure of 1200 p.s.i. in the space 30 above the moderator in the vessel 1, there will be a pressure of approximately 1204 p.s.i. at the bottom of the vessel 1 where the conduit 19 connects and also a pressure of approximately 1204 p.s.i. at the bottom of the chamber 15. The pressure at the intake side of the pump 44 will, however, be of the order of 1180 p.s.i. because of the drop through the heat exchanger 22, and thus a pressure differential of about 24 p.s.i. will exist from end to end of the conduit 45 and moderator will flow upwardly from the chamber 15 as a result thereof. The stand pipes 16 will be retained to provide the steady drainage in the reverse direction, and control over the moderator level in the vessel 1 will be exercised by a valve 46 in the conduit 45.

Figure 6:
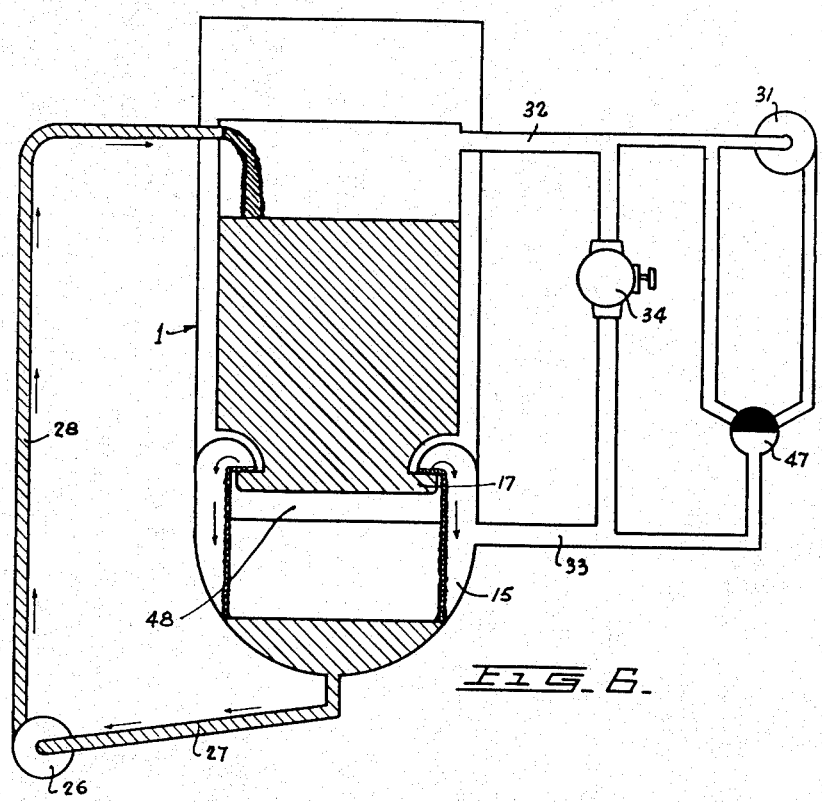
FIGURE 6 shows a simplified schematic illustration of the reactor in a manner similar to FIGURE 2 illustrating a still further modification.
Figure 7:
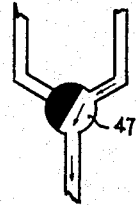
FIGURE 7 is a fragmentary view of the control valve of the system of FIGURE 6, shown in a different position.
Figure 8:
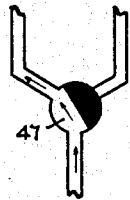
FIGURE 8 is a view of the valve in FIGURE 7 shown in a third position.

A still further alternative method of exercising fine control over the moderator level in the reactor vessel 1 is illustrated in FIGURES 6 to 8. In the methods described heretofore the fine control has been obtained by means of a pumping system acting to transfer moderator from the storage chamber 15 to the vessel 1, provision being made for reverse flow either through the stand pipes 16 (FIGURES 2 and 5) or through the pumping system itself (FIGURE 4).

In the method now to be described, fine control over the moderator level is exercised by the helium pressure system. The body of moderator in the storage chamber 15 situated below the vessel 1 is drawn by a pump 26 along conduit 27 to be fed back to the vessel 1 through conduit 28. In the present case, however, the moderator enters the vessel 1 near the top thereto. As before, the helium pressure system comprises a conduit 32 leading from the upper part of the vessel 1; a conduit 33 communicating with the upper part of the storage chamber 15; and a pump 31 and dump valve 34 arranged in parallel between these two conduits. In addition the present system provides a three-way control valve 47 arranged either to prevent communication between conduits 32 and 33 (FIGURE 6 position) to connect the pump 31 to the conduit 33 (FIGURE 7), or to connect the conduits 32 and 33 directly to one another, as seen in FIGURE 8.

In the systems illustrated in FIGURES 2, 4 and 5, a slight excess helium pressure is always maintained in the storage chamber 15, the result of which is a continuous bubbling of helium around the passageway 17 and up through the body of moderator in the vessel 1 to recirculate through the helium pump 31. In the system illustrated in FIGURES 6 to 8, the reverse action takes place, in that there is a spilling of moderator down through the passageway 17 and into the storage chamber 15. Moderator is continuously pumped up into the vessel 1 by the pump 26. If the control valve 47 is maintained in its closed central position, as seen in FIGURE 6, in which it prevents any normal communication between the conduits 32 and 33, the amount of helium in the storage chamber 15 will remain constant so that the system will reach an equilibrium position with the amount of moderator pumped up by the pump 26 spilling back into the storage chamber 15 through the passageway 17 and the level in the vessel 1 remaining constant. If the helium control valve 47 is turned to the position seen in FIGURE 7 so that more helium is pumped from the vessel 1 into the storage chamber 15, the rate of spill will be temporarily reduced and the liquid level of moderator in the vessel 1 will rise. As soon as the valve 47 is turned back into its central position a new equilibrium condition will exist, the rate of spill again equaling the rate of pumping and the moderator level remaining constant at a new value. When the helium control valve 47 is turned to the FIGURE 8 position, it will allow helium to escape slowly from the storage chamber 15 into the top of the reactor vessel 1 so that the level in such vessel will fall steadily until the control valve 47 is turned back again into its central position. Emergency shut-down will take place exactly as in the previous systems by rapid draining of the moderator into the storage chamber 15 on opening of the dump valve 34.

Finally, it should be mentioned that FIGURE 6 illustrates a slightly different construction of dumping passageway 17. It forms a figure of revolution of a U-tube and functions in exactly the same manner as in the previous constructions, but is arranged to spill radially outwardly rather than inwardly.

We claim:

1. An atomic power reactor comprising a core vessel, coolant circulating tubes therein, a storage chamber disposed at a level below the floor of said vessel, fine control means for effecting transfer of liquid between said vessel and said chamber in either direction at a slow rate, an uninterrupted passageway of large cross-sectional area extending between the lower part of said vessel and the upper part of said chamber, said passageway including a downwardly projecting loop, means for maintaining a gaseous pressure in said chamber in excess of a gaseous pressure in said vessel sufficient to support a body of liquid in said vessel by action against a stable free surface of such liquid in said passageway adjacent said loop, and means for rapidly eliminating said gaseous pressure.

2. An atomic power reactor as claimed in claim 1 wherein said passageway comprises an annular passageway projecting downwardly from adjacent the periphery of the lower portion of the core vessel, said passageway being substantially in the form of a figure of revolution of a U-tube.

3. An atomic power reactor as claimed in claim 1 wherein said means for rapidly eliminating said excess gaseous pressure comprise a conduit of large cross-sectional area connecting the upper parts of said vessel and chamber and a rapid acting valve in said conduit.

4. An atomic power reactor as claimed in claim 1 wherein said fine control means comprise a conduit of small cross-sectional area connecting said vessel with the lower part of said chamber, pump means for draining liquid from the lower part of said chamber and introducing such liquid into said vessel, and means for regulating the flow through said pump means.

5. An atomic power reactor as claimed in claim 1 wherein said fine control means comprise a conduit extending between the lower part of said chamber and said vessel, pump means in said conduit for pumping liquid in the direction from said chamber towards said vessel, a by-pass conduit connecting the intake and output sides of said pump, and means for regulating the flow through said by-pass conduit.

6. An atomic power reactor as claimed in claim 1 including a heat exchanger, means for circulating liquid moderator in said core vessel through said heat exchanger whereby to cool said moderator, and means for regulating the degree of cooling imparted to said moderator in said heat exchanger.

7. An atomic power reactor as claimed in claim 1 including a heat exchanger, a pump arranged on the downstream side of said heat exchanger for circulating liquid moderator in said core vessel through said heat exchanger to cool said moderator, and means for regulating the degree of cooling imparted to said moderator in said heat exchanger, said fine control means comprising a conduit extending between the intake side of said pump and the lower part of said chamber, means for regulating the flow of moderator along said conduit, and a second conduit of small cross-sectional area connecting said vessel with the lower part of said chamber.

8. An atomic power reactor comprising a core vessel, coolant circulating tubes therein, a storage chamber disposed at a level below the floor of said vessel, means for continuously transferring liquid moderator from the lower part of said chamber to said vessel, an uninterrupted passageway of large cross-sectional area extending between the lower part of said vessel and the upper part of said chamber, said passageway including a downwardly projecting loop, means for maintaining a gaseous pressure in said chamber in excess of a gaseous pressure in said vessel sufficient at least substantially to support a body of liquid in said vessel by action against a stable free surface of such liquid in said passageway adjacent said loop, fine moderator level control means for varying the quantity of gas in said chamber at a slow rate, and means for rapidly eliminating said excess gaseous pressure.

9. An atomic power reactor as claimed in claim 8, wherein said fine moderator level control means comprise a first conduit communicating with the upper part of said vessel, a second conduit communicating with the upper part of said vessel, a third conduit communicating with the upper part of said chamber, pump means situated in said first conduit for transferring gas through said conduit away from said vessel, and a three-way control valve interconnecting said three conduits and having a first position preventing communication between said first and second conduits and said third conduit whereby to prevent communication between said vessel and said chamber, a second position establishing communication between said first conduit and said third conduit whereby to establish communication between said vessel and said chamber through said pump means to increase the quantity of gas in said chamber, and a third position establishing communication between said second conduit and said third conduit whereby to establish direct communication between said vessel and said chamber to decrease the quantity of gas in said chamber.

10. An atomic power reactor comprising a core vessel, coolant circulating tubes therein, fissile fuel in said tubes, a body of liquid moderator in said vessel, a body of inert gas maintained under pressure above the free surface of the moderator in said vessel, a moderator storage chamber disposed at a level below the floor of said vessel, a body of liquid moderator in said chamber, a body if inert gas maintained under pressure above the free surface of the moderator in said chamber, fine control means for effecting transfer of moderator between said vessel and said chamber in either direction at a slow rate, an uninterrupted passageway of large cross-sectional area extending between the lower part of said vessel and the upper part of said chamber, said passageway including a downwardly projecting loop, means for maintaining a gaseous pressure in said chamber in excess of the gaseous pressure above the moderator in said vessel sufficient to support the body of moderator in said vessel by action against a stable free surface of said moderator adjacent said loop, and means for rapidly eliminating said excess gaseous pressure in said chamber.

References Cited in the file of this patent

UNITED STATES PATENTS

| | | |
|---|---|---|
| 2,743,225 | Ohlinger et al. | Apr. 24, 1956 |
| 2,770,591 | Wigner et al. | Nov. 13, 1956 |

OTHER REFERENCES

Nucleonics, vol. 11, June 1953, pages 53–55. (Copy in Scientific Library.)